United States Patent
Fitzgerald et al.

(10) Patent No.: US 7,086,830 B2
(45) Date of Patent: Aug. 8, 2006

(54) TUBE-TYPE VORTEX REDUCER WITH RETAINING RING

(75) Inventors: Ian Fitzgerald, Eichwalde (DE); Christian Seydel, Stahnsdorf (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 0 days.

(21) Appl. No.: 10/797,059

(22) Filed: Mar. 11, 2004

(65) Prior Publication Data

US 2004/0179936 A1    Sep. 16, 2004

(30) Foreign Application Priority Data

Mar. 12, 2003 (DE) ................ 103 10 815

(51) Int. Cl.
*F01D 25/12* (2006.01)

(52) U.S. Cl. .................... 415/115; 416/244 R

(58) Field of Classification Search ............. 415/115, 415/116, 244 R, 416; 416/244 R
See application file for complete search history.

(56) References Cited

U.S. PATENT DOCUMENTS

| | | | | |
|---|---|---|---|---|
| 2,772,069 A | * | 11/1956 | Hockert et al. | ............ 415/134 |
| 2,917,276 A | * | 12/1959 | Klompas et al. | ............ 415/189 |
| 4,034,558 A | | 7/1977 | Korta et al. | |
| 4,576,547 A | * | 3/1986 | Weiner et al. | ............ 415/116 |
| 5,482,431 A | | 1/1996 | Taylor | |
| 6,397,604 B1 | | 6/2002 | Eldrid et al. | |
| 6,648,592 B1 | * | 11/2003 | Escure et al. | ............ 415/115 |
| 2002/0182059 A1 | * | 12/2002 | Escure et al. | ............ 415/115 |
| 2003/0101730 A1 | | 6/2003 | Hein et al. | |

FOREIGN PATENT DOCUMENTS

| | | |
|---|---|---|
| DE | 4216031 | 10/1993 |
| DE | 10159670 | 6/2003 |

OTHER PUBLICATIONS

German Search Report dated Mar. 12, 2003.

* cited by examiner

*Primary Examiner*—Edward K. Look
*Assistant Examiner*—Nathan Wiehe
(74) *Attorney, Agent, or Firm*—Timothy J. Klima

(57) ABSTRACT

A tube-type vortex reducer conducts cooling air in a compressor (1) of a gas turbine. Radial secondary air tubes (2) are arranged in a disk interspace (5) and attached to a compressor disk (3) with their radial outward end sections. The end sections of the secondary air tubes (2) are attached to a separate carrier ring (6), which is connected to a compressor disk (3).

17 Claims, 10 Drawing Sheets

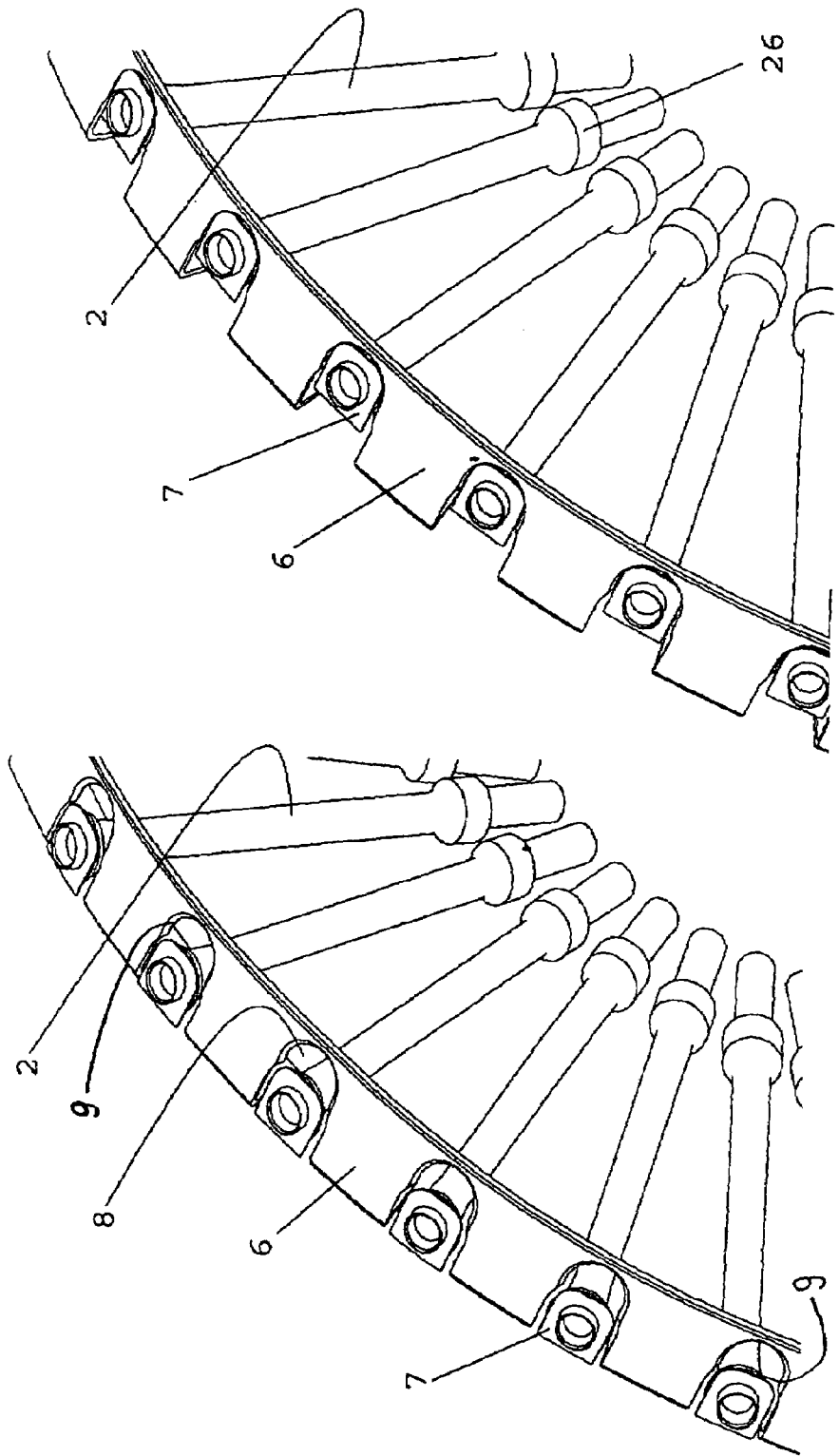

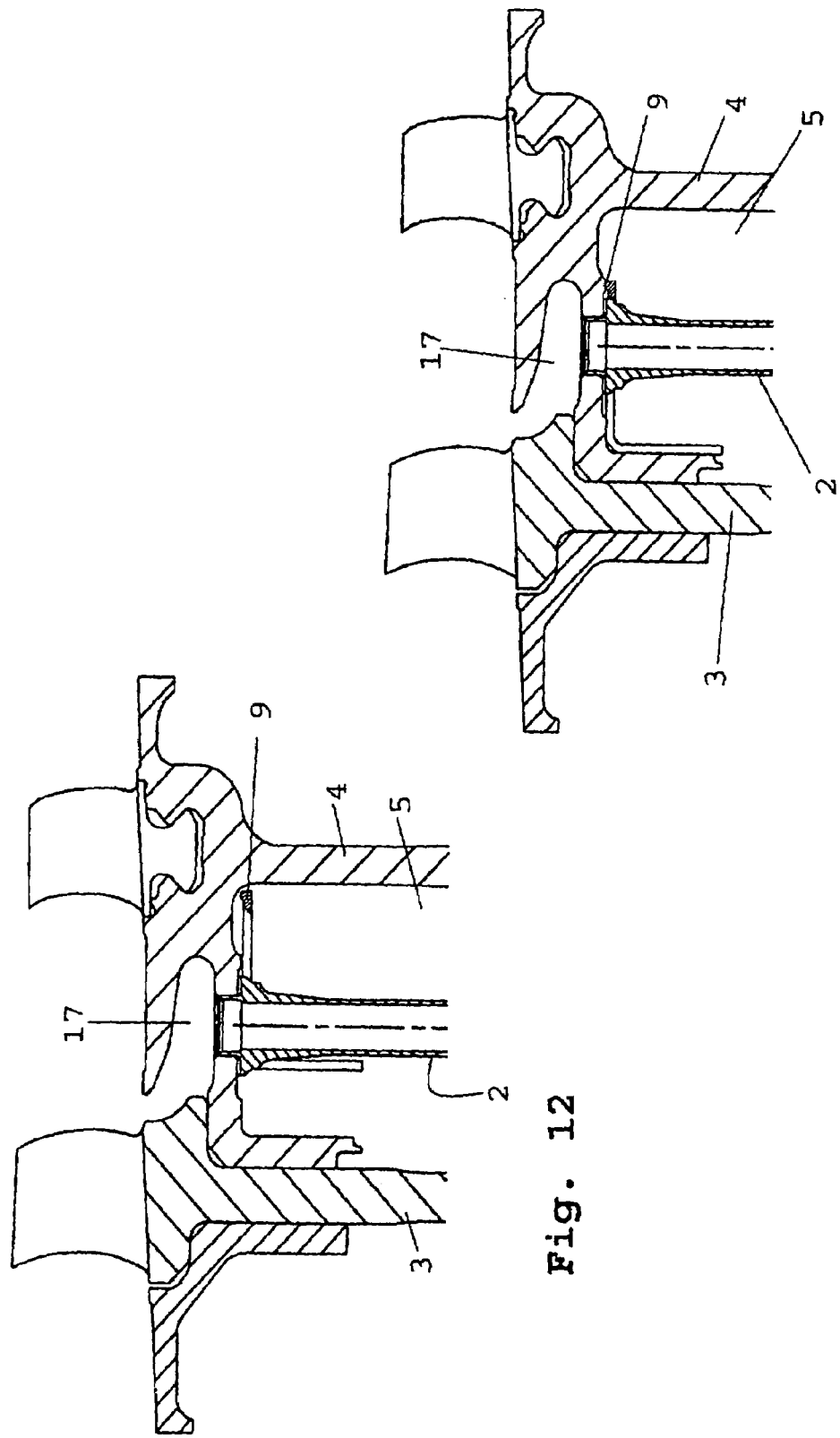

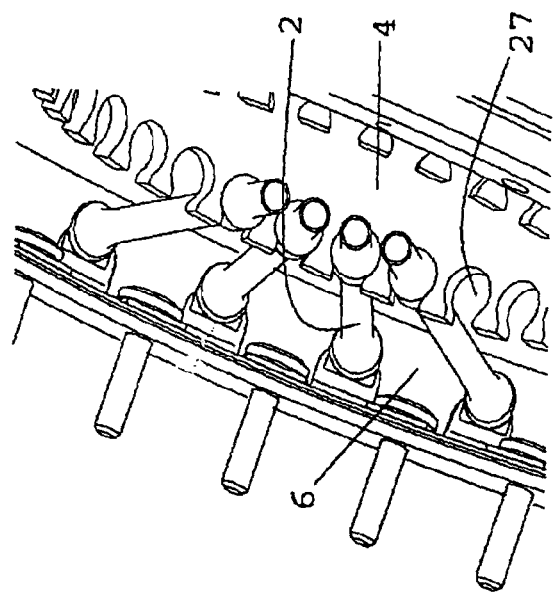
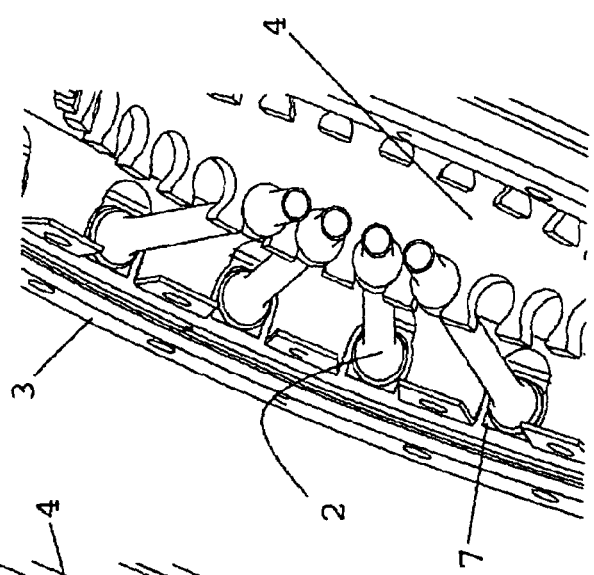
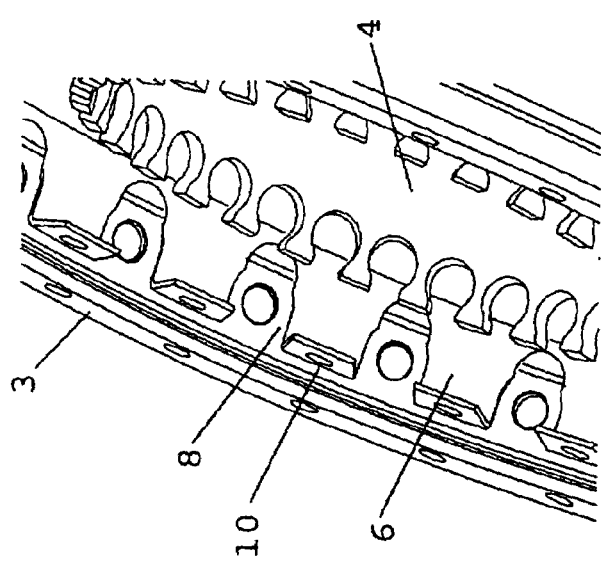

TUBE-TYPE VORTEX REDUCER WITH RETAINING RING

This application claims priority to German Patent Application DE10310815.7 filed Mar. 12, 2003, the entirety of which is incorporated by reference herein.

BACKGROUND OF THE INVENTION

This invention relates to a tube-type vortex reducer. More particularly, the present invention relates to a vortex reducer for the conduction of cooling air in a compressor of a gas turbine, with radial secondary air tubes being arranged in a disk interspace and attached to a compressor disk with their radial outward end section.

In the state of the art, designs are known in which the secondary air tubes are fitted to corresponding locations on the disks by a pressing, riveting, screwing, snapping or forging process. These designs are disadvantageous in that adequate working space must be provided to enable the secondary air tubes to be installed with suitable tools. Therefore, the secondary air chamber, through which the secondary air enters the secondary air tubes, must be given a relatively large cross-section. This involves high manufacturing costs. Furthermore, the compressor disk may be damaged during the installation of the secondary air tubes. Since this disk is very expensive, risk of damage is a cost-relevant aspect of considerable importance.

BRIEF SUMMARY OF THE INVENTION

In a broad aspect, the present invention provides a tube-type vortex reducer of the type described at the beginning which, while being simply designed, is easily usable, dependable in operation, and can be produced cost-effectively.

It is a particular object of the present invention to provide solution to the above problems by the combination of the features described herein. Further advantageous embodiments of the present invention should be apparent from the description below.

The present invention accordingly provides for a secondary air tube, the end section of which is attached to a separate, segmented carrier ring which is separately connected to one of the compressor disks. The vortex reducer according to the present invention has a variety of merits.

As a first advantage, the inventive design enables the secondary air tubes to be attached by way of the carrier ring. Their installation immediately on the compressor disks is, therefore, not required. This precludes the compressor disks from being damaged.

A further, major advantage lies in the fact that the cross-section of the secondary air chamber can be kept small since no tools or similar equipment for the installation of the secondary air tubes need to be introduced into the secondary air chamber. Generally, this results in an increased stiffness of the compressor disks, which also provides for vibration reduction. The selected assembly method according to the present invention fully precludes disk damage, such as scratches, nicks or the like caused by the peening process, thus avoiding premature failure or rework.

It is particularly favorable if the secondary air tubes are attached to the carrier ring by way of a form fit. In a preferred form, this can be accomplished by means of a mounting shoe provided at the end section of the secondary air tubes which can be inserted into a slot of the carrier ring and secured by means of a locking element. This arrangement provides for a high degree of axial stability. It also facilitates assembly to a considerable extent.

In a preferred form, the carrier ring according to the present invention is given the shape of an angle section. This increases the inherent stability of the carrier ring and also enables the carrier ring to be provided with bolt holes for attaching the carrier ring to one of the compressor disks by means of axial bolts. The different positions of the slots and the bolt holes provide for an assembly-friendly, space-saving design, with each of the bolt holes being located centrally between adjacent slots. To facilitate assembly, the carrier ring, in accordance with the present invention, can be split into several, for example three, segments. The carrier can be inserted into the disk interspace without straining the segments.

For safe retention of the radial inward end section of the secondary air tube, it is particularly favorable to locate it on the compressor disk by means of a form fit. To accomplish this, no separate tooling is required which, again, would require appropriate working space or could lead to damage.

BRIEF DESCRIPTION OF THE DRAWINGS

The present invention is more fully described in the light of the accompanying drawings showing preferred embodiments. In the drawings, FIG. 1 (Prior Art) is a schematic partial view of an embodiment according to the state of the art, FIG. 2 (prior Art) is a view analogically to FIG. 1, of a further embodiment according to the state of the art, FIG. 10 is a representation, analogically to FIGS. 8 and 9, of a first step for the assembly of the secondary air tubes to a carrier ring, FIG. 11 is a representation of a final assembly step performed subsequently to that represented in FIG. 10, FIG. 12 is an enlarged representation of the installation of the secondary air tubes by means of a locking element, FIG. 13 is a representation, analogically to FIG. 12, of the finally assembled state, FIG. 14 is a perspective partial view of the allocation of the carrier ring to the compressor disks.

FIG. 15 is a representation, analogically to FIG. 14, with preassembled secondary air tubes, FIG. 16 is a representation, analogically to FIGS. 14 and 15 with finally assembled secondary air tubes.

DETAILED DESCRIPTION OF THE INVENTION

Figure 17:
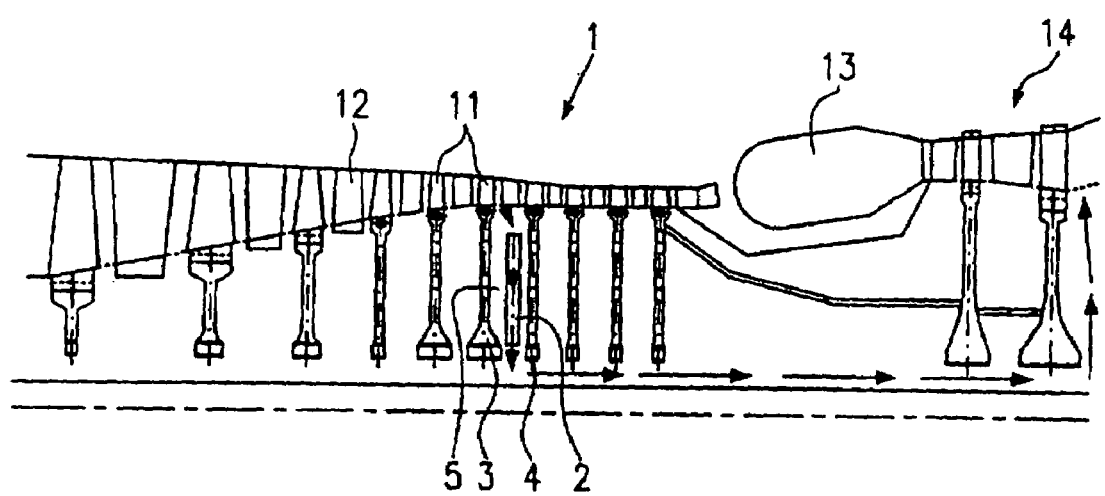
FIG. 17 is a simplified sectional view of a portion of an inventive gas turbine, using the present invention.

FIG. 17 shows a partial sectional view of an inventive gas turbine. Reference numeral 1 shows a compressor comprising rotor blades 11 and stator vanes 12. The rotor blades 11 are fixed to the compressor disks 3 or 4, respectively. These form a disk interspace 5 in which several, radial secondary air tubes 2 are arranged. Reference numeral 13 indicates a combustion chamber, while reference numeral 14 designates a turbine in schematic representation. The arrows schematically indicate the route of the secondary air flow.

Figure 1:
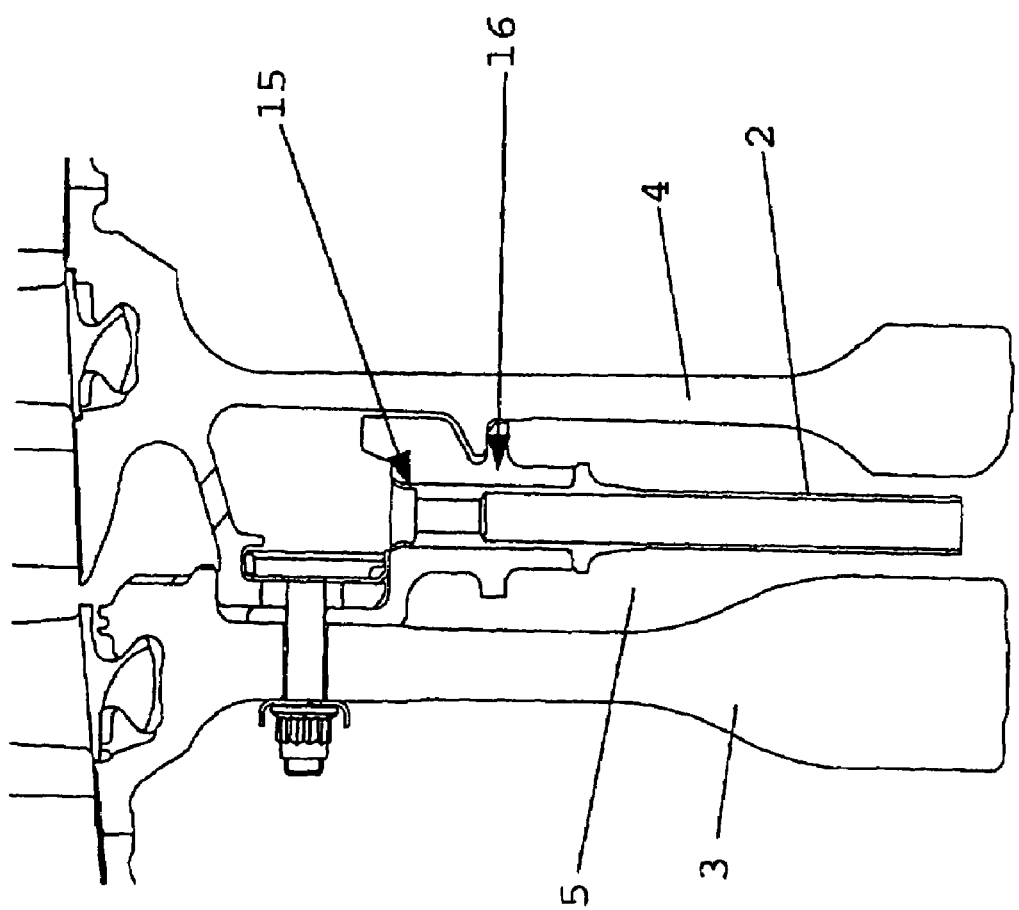
Figure 2:
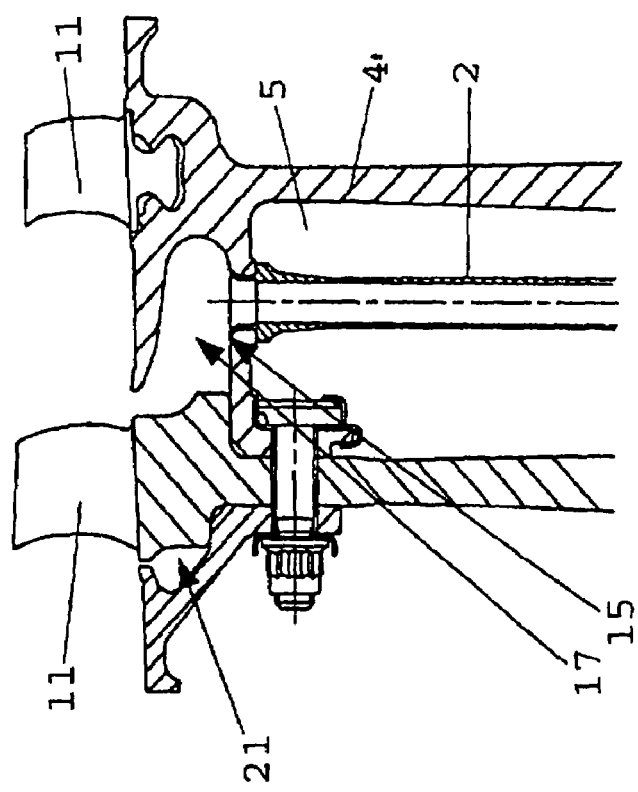

FIGS. 1 and 2 show embodiments according to the state of the art. Obviously, the end sections of the secondary air tubes are riveted, as indicated by the reference numeral 15. Reference numeral 16 designates an additional carrier disk which represents an additional volume element and is fitted in the disk interspace 5.

FIG. 2 shows a similar embodiment, with a riveted joint again being indicated by the reference numeral 15. As becomes apparent, a very large secondary air chamber 17 must be provided to allow the riveting tool to be introduced.

Figure 3:
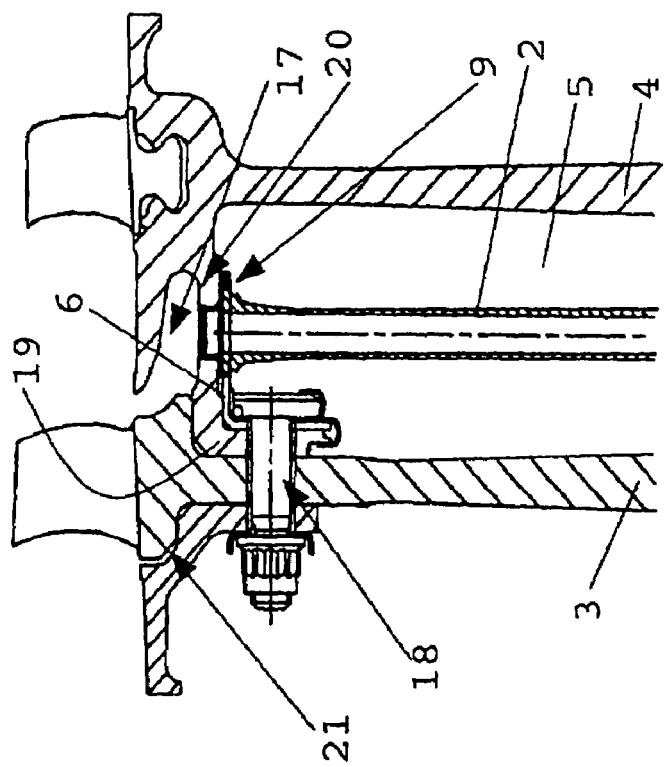
FIG. 3 is a sectional view, analogically to FIGS. 1 and 2 of a first embodiment of the present invention.

FIG. 3 shows a first embodiment according to the present invention. As can be seen, the free end of the secondary air tube is located on an angle-section carrier ring 6. The secondary air chamber 17 can here be very small since no pressing tool needs to be introduced into it. The carrier ring 6 is attached to the compressor disk 3 by means of bolts 18. The bolt 18 also holds a mounting flange 19 of the further compressor disk 4. Thanks to the present invention, the carrier ring 6 can be dimensioned and designed such that a very favorable design of the mounting flange 19 can be achieved, resulting in an enlarged, improved radius 20 of said mounting flange 19. Further, it is possible to minimize a chamber 21 at the radially outward end of the compressor disk 3.

Figure 4:
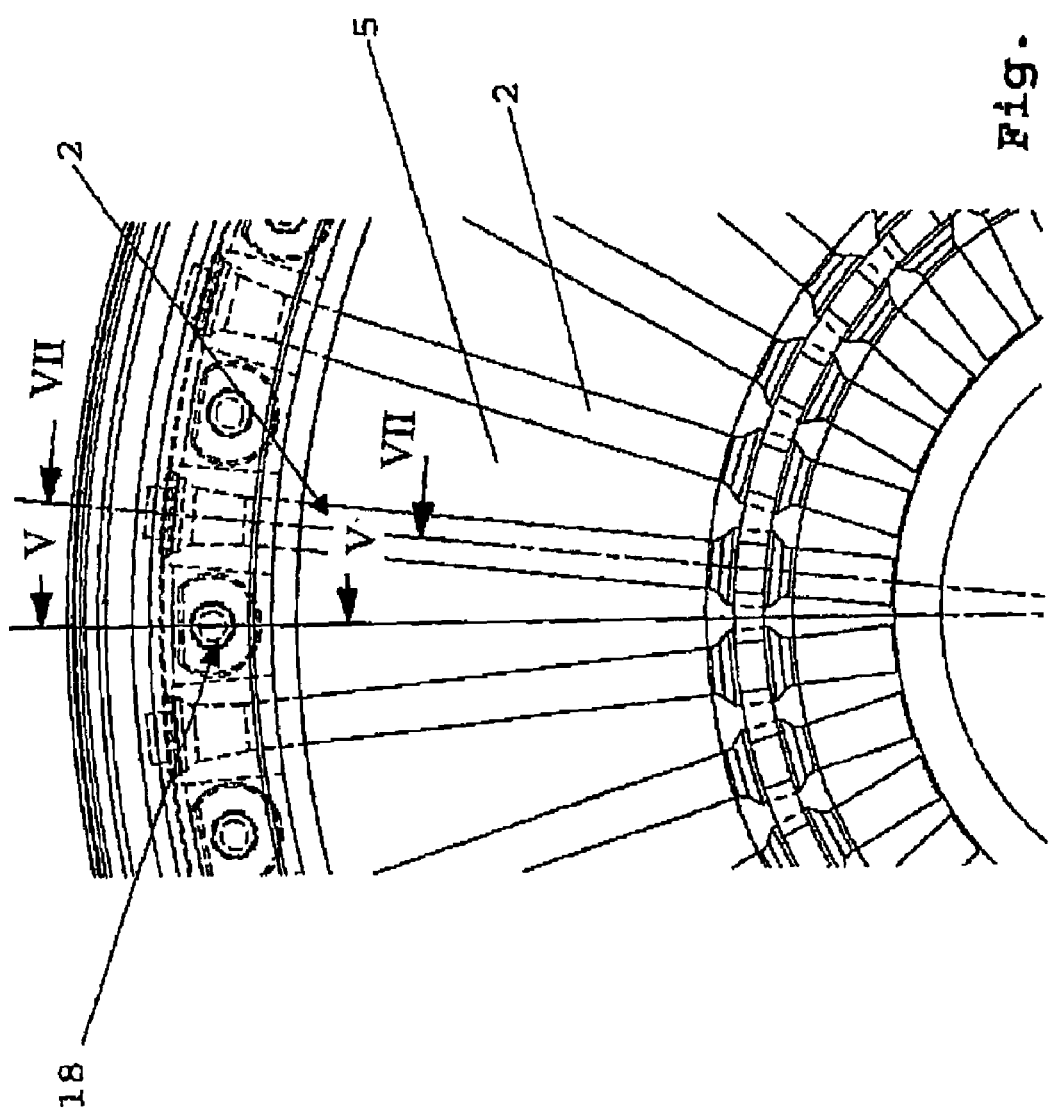
FIG. 4 is a partial front view of the arrangement according to the present invention.

FIG. 4 shows an axial partial view illustrating that the bolts 18 and the secondary air tubes 2 are offset relative to each other in alternation on the circumference.

Figure 5:
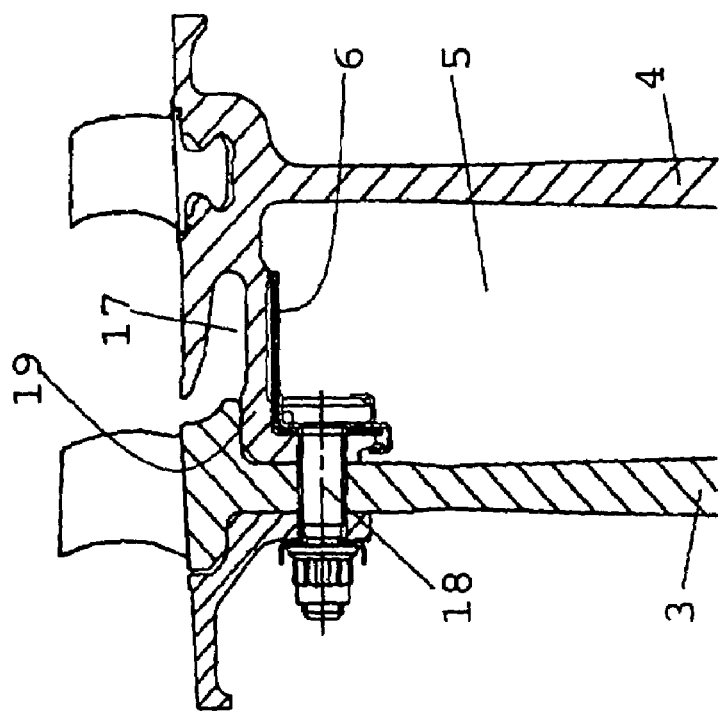
FIG. 5 is a sectional view along line V—V of FIG. 4.

FIG. 5 shows an enlarged partial sectional view along line V—V of FIG. 4, showing again in detail the carrier ring 6 and the bolts 18 as well as further locking elements and the nuts required.

Figure 6:
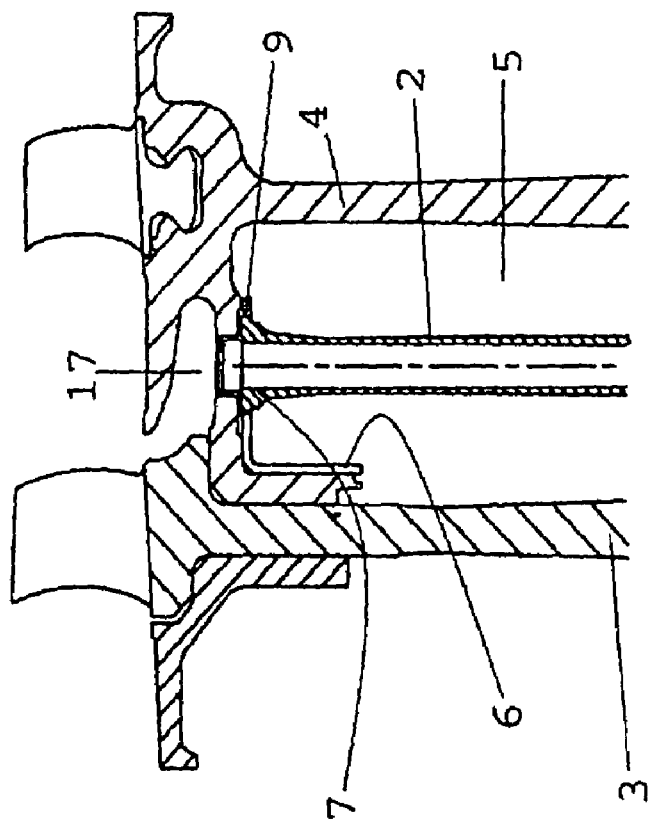
FIG. 6 is a sectional view along line VII—VII of FIG. 4.

FIG. 6 shows a sectional view along line VII—VII of FIG. 4 with the secondary air tubes in the installed state. In particular, a mounting shoe 7, which is detailed hereinafter, is shown on the end section of each secondary air tube 2. Furthermore, a locking element 9 for the retention of the mounting shoe 7 is shown, this locking element 9 also being explained hereinafter.

Figure 7:
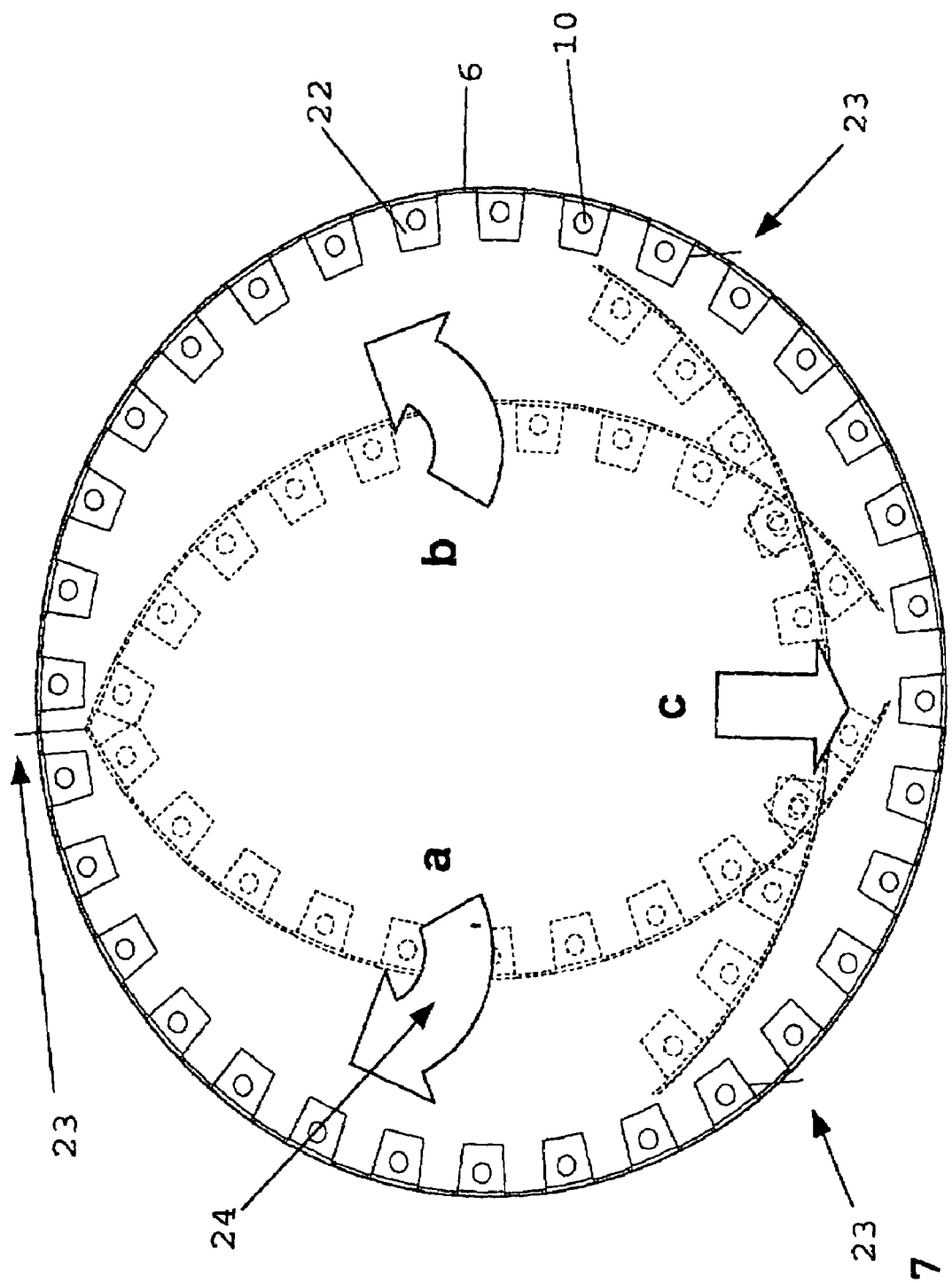
FIG. 7 is a front view of the carrier ring in accordance with the present invention, and of individual segments forming this carrier ring.
Figure 9:
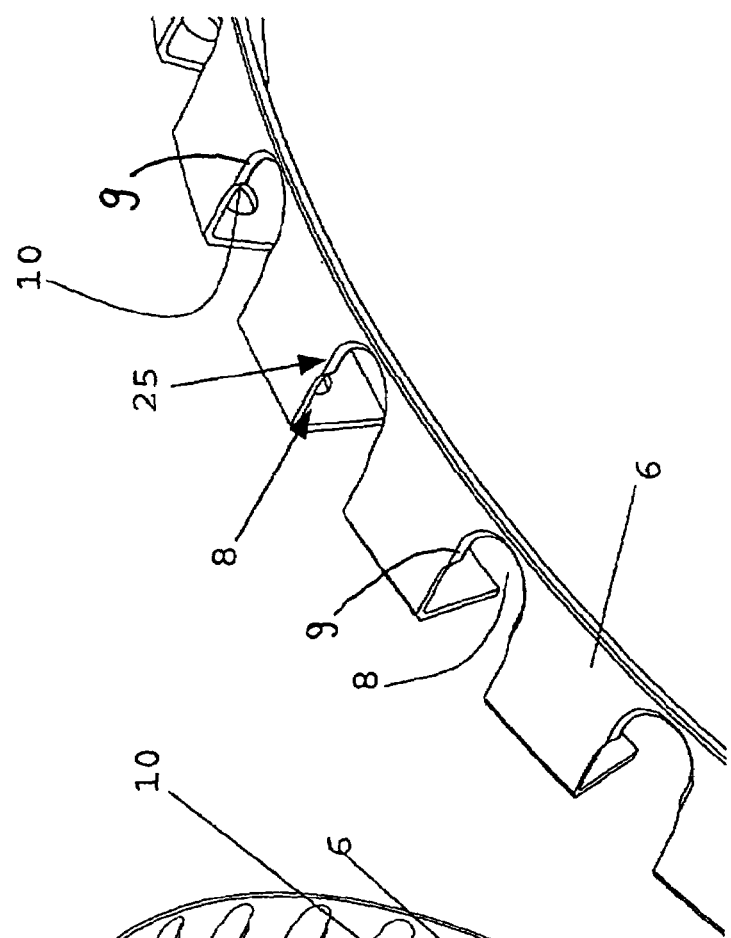
FIG. 9 is an enlarged partial representation of the carrier ring shown in FIG. 8.

FIG. 7 is an axial view of the carrier ring 6 according to the present invention. As can be seen, individual mounting pads 22 with bolt holes 10 for the bolts 18 are provided.

As becomes apparent from FIG. 7, the carrier ring 6 may include individual segments a, b and c to facilitate installation. Reference numeral 23 indicates the splits, these being located and arranged essentially radially (upper split in FIG. 7) as well as diagonally to the upper split. The large arrows 24 indicate the installation direction of the segments a, b and c.

Figure 8:
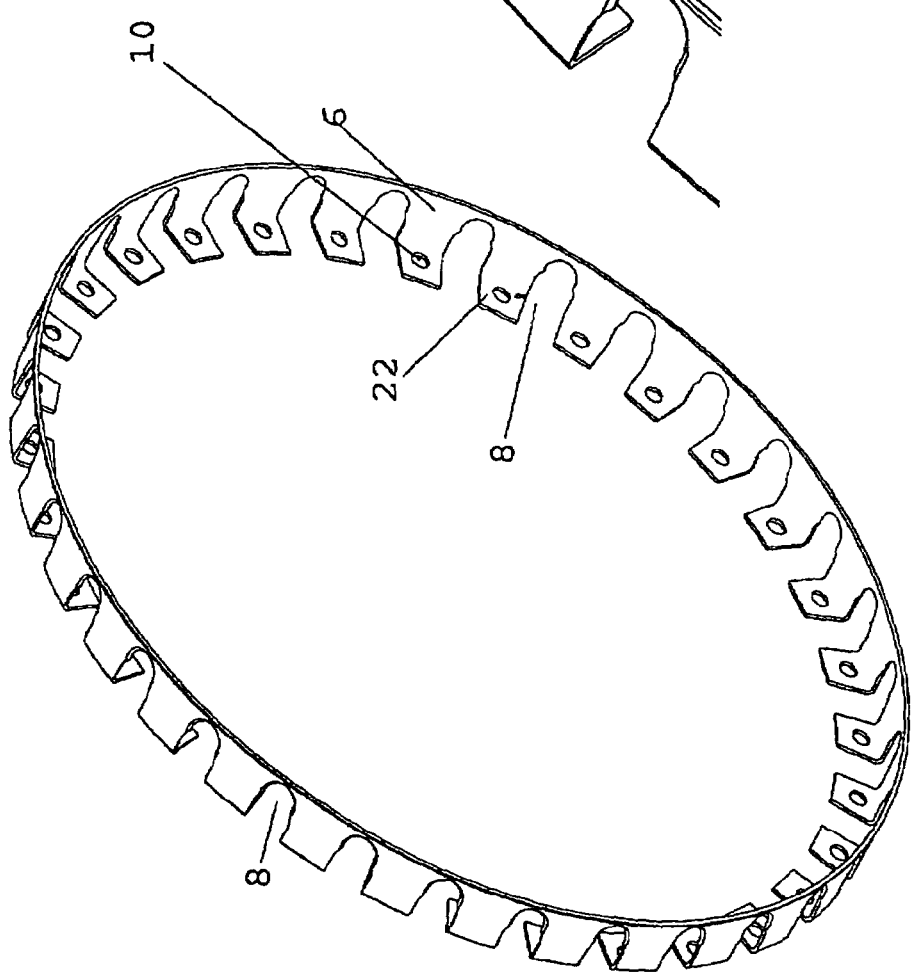
FIG. 8 is a perspective view of the carrier ring in accordance with the present invention.

FIG. 8 is a perspective representation of the carrier ring 6 according to the present invention. The figure clearly shows that a slot 8 is provided between adjacent mounting pads 22 into which the mounting shoe 7 of the secondary air tube 2 can be inserted. Reference numeral 25 designates a registering skew, or a chamfered, skewed area of the locking element 9, which enables the mounting shoe 7 to be accurately fitted. See also, FIGS. 9, 10, 12 and 13. The chamfered area of the locking element 9 faces radially outwardly and is configured to engage a corresponding radially inwardly chamfered area of the mounting shoe 7 of the secondary air tube 2. This locking engagement secures the secondary air tube 2 in place and prevents the secondary air tube 2 from moving radially inwardly. The radially outwardly and inwardly facing portions can have alternative configurations other than chamfered.

FIGS. 10 and 11 show assembly steps, illustrating the manner in which the individual mounting shoes 7 of the secondary air tubes 2 are inserted into the slots 8. FIG. 11 shows the finally assembled, inserted state. Subsequently, as shown in FIG. 12, the locking element 9 interacts with the mounting shoe 7 to clamp the secondary air tube 2 in place.

FIGS. 14 to 16 again show various assembly states in different perspective. FIG. 14 shows a state in which the carrier ring 6 is fitted between the two compressor disks 3 and 4. FIG. 15 shows the pre-assembly of the secondary air tubes 2 (analogically to FIG. 10). FIG. 16 is a representation of the finally assembled state, analogically to FIG. 13.

As becomes apparent, in particular, each of the radially inward end sections of the secondary air tubes 2 is provided with a flange 26 (see FIG. 11) which is insertable into a profiled, essentially circular recess 27 (see FIG. 16) of the compressor disk 4. This arrangement enables the free end sections of the secondary air tubes 2 to be retained effectively.

LIST OF REFERENCE NUMERALS

1 Compressor
2 Secondary air tube
3 Compressor disk
4 Compressor disk
5 Disk interspace
6 Carrier ring
7 Mounting shoe
8 Slot
9 Locking element
10 Bolt hole
11 Rotor blade
12 Stator vane
13 Combustion chamber
14 Turbine
15 Riveted joint
16 Carrier disk
17 Secondary air chamber
18 Bolt
19 Mounting flange
20 Radius
21 Chamber
22 Mounting pad
23 Split
24 Arrow
25 Registering skew
26 Flange
27 Recess

What is claimed is:

1. A tube-type vortex reducer for the conduction of cooling air in a compressor of a gas turbine including radial secondary air tubes arranged in a disk interspace and attached to a compressor disk with their radial outward end sections, comprising: a separate carrier ring constructed and arranged to connect to a compressor disk, the end sections of the secondary air tubes being attached to the carrier ring; wherein the end sections of the secondary air tubes are provided with mounting shoes which can be inserted into respective axially-opening slots in the carrier ring in a form-filling manner and secured in the slots by locking elements.

2. A tube-type vortex reducer in accordance with one claim 1, wherein the carrier ring has a shape of an angle section.

3. A tube-type vortex reducer in accordance with claim 2, wherein the carrier ring is provided with bolt holes for mounting to the compressor disk which are offset to the slots on the circumference.

4. A tube-type vortex reducer in accordance with claim 3, wherein the carrier ring is split into a plurality of segments.

5. A tube-type vortex reducer in accordance with claim 4, wherein radial inward end sections of the secondary air tubes are located on the compressor disk by a form fit.

6. A tube-type vortex reducer in accordance with claim 5, wherein the locking elements comprise radially outwardly facing portions that engage radially inwardly facing portions of the mounting shoes of the secondary air tubes.

7. A tube-type vortex reducer in accordance with claim 6, wherein the radially outwardly facing portions of the looking elements are chamfered and the radially inwardly facing portions of the mounting shoes are chamfered.

8. A tube-type vortex reducer in accordance with claim 1, wherein the carrier ring is provided with bolt holes for mounting to the compressor disk which are offset to the slots on the circumference.

9. A tube-type vortex reducer in accordance with claim 8, wherein the carrier ring is split into a plurality of segments.

10. A tube-type vortex reducer in accordance with claim 9, wherein radial inward end sections of the secondary air tubes are located on the compressor disk by a form fit.

11. A tube-type vortex reducer in accordance with claim 10, wherein the looking elements comprise radially outwardly facing portions that engage radially inwardly facing portions of the mounting shoes of the secondary air tubes.

12. A tube-type vortex reducer in accordance with claim 11, wherein the radially outwardly facing portions of the looking elements are chamfered and the radially inwardly facing portions of the mounting shoes are chamfered.

13. A tube-type vortex reducer in accordance with claim 1, wherein the carrier ring is split into a plurality of segments.

14. A tube-type vortex reducer in accordance with claim 1, wherein radial inward end sections of the secondary air tubes are located on the compressor disk by a form fit.

15. A tube-type vortex reducer in accordance with claim 1, wherein the locking elements comprise radially outwardly facing portions that engage radially inwardly facing portions of the mounting shoes of the secondary air tubes.

16. A tube-type vortex reducer in accordance with claim 15, wherein the radially outwardly facing portions of the locking elements are chamfered and the radially inwardly facing portions of the mounting shoes are chamfered.

17. A tube-type vortex reducer for the conduction of cooling air in a compressor of a gas turbine including radial secondary air tubes arranged in a disk interspace and attached to a compressor disk with their radial outward end sections, comprising; a separate carrier ring constructed and arranged to connect to a compressor disk, the end sections of the secondary air tubes being attached to the carrier ring and secured to the carrier ring by locking elements; wherein the locking elements comprise radially outwardly facing portions that engage radially inwardly facing portions of mounting shoes of the secondary air tubes and wherein the radially outwardly facing portions of the locking elements are chamfered and the radially inwardly facing portions of the mounting shoes are chamfered.

* * * * *